United States Patent [19]

Honjo et al.

[11] Patent Number: 5,018,714
[45] Date of Patent: May 28, 1991

[54] ORIGINAL HANDLING APPARATUS

[75] Inventors: Takeshi Honjo, Kawasaki; Kenji Kobayashi, Tokyo; Akimaro Yoshida, Tokyo; Takami Saeki, Tokyo, all of Japan

[73] Assignee: Canon Kabushiki Kaisha, Tokyo, Japan

[21] Appl. No.: 516,946

[22] Filed: Apr. 30, 1990

Related U.S. Application Data

[63] Continuation of Ser. No. 143,050, Jan. 12, 1988, abandoned.

[30] Foreign Application Priority Data

Jan. 14, 1987 [JP] Japan .................................. 62-6358

[51] Int. Cl.$^5$ ............................................. B65H 5/22
[52] U.S. Cl. ....................................... 271/3.1; 271/301; 271/291; 271/902
[58] Field of Search ................. 271/3.1, 301, 291, 902

[56] References Cited

U.S. PATENT DOCUMENTS

| | | | |
|---|---|---|---|
| 4,469,436 | 9/1984 | Jones et al. | 271/3.1 X |
| 4,508,447 | 4/1985 | Doery | 271/3.1 X |
| 4,579,327 | 4/1986 | Furuichi | 271/3.1 |

Primary Examiner—David H. Bollinger
Attorney, Agent, or Firm—Fitzpatrick, Cella, Harper & Scinto

[57] ABSTRACT

An original handling apparatus includes a sheet cassette for storing a bundle of originals, an RDF for feeding each bundle of originals stored in the sheet cassette to an exposure position, discharging the exposed original from the exposure position, and circulating the exposed original to the sheet cassette, an operation panel for setting a desired number of circulation cycles of the bundle of originals stored in the sheet cassette, and a microcomputer (including a CPU) for controlling the RDF to allow it to start a next circulation cycle prior to an end of a current circulation cycle in a plurality of circulation cycles.

5 Claims, 4 Drawing Sheets

ORIGINAL HANDLING APPARATUS

This application is a continuation of application Ser. No. 143,050 filed Jan. 12, 1988 now abandoned.

BACKGROUND OF THE INVENTION

The present invention relates to an original handling apparatus for feeding an original from a set position to an exposure position and returning the original to the initial set position after exposure.

In a conventional copying machine with an original circulation apparatus of this type, if a plurality of copy sets are required, the originals are circulated by the number of times corresponding to the plurality of copy sets (e.g., U.S. Ser. Nos. 632,312, 777,020 and 780,576). In this case, the processing speed is undesirably decreased at a timing between the circulation cycles. This is because the first original in the second circulation cycle is fed after the last original in the first circulation cycle is discharged.

SUMMARY OF THE INVENTION

The present invention has been made in consideration of the above situation, and has as its object to provide an improved original handling apparatus.

It is another object of the present invention to provide an original handling apparatus having a high processing speed.

It is still another object of the present invention to provide an original handling apparatus wherein original change processing between the circulation cycles of the originals is not delayed.

The above and other objects of the present invention will be apparent from the following detailed description in conjunction with the accompanying drawings.

DETAILED DESCRIPTION OF THE PREFERRED EMBODIMENT

An embodiment of the present invention will be described with reference to the accompanying drawings.

Figure 1:
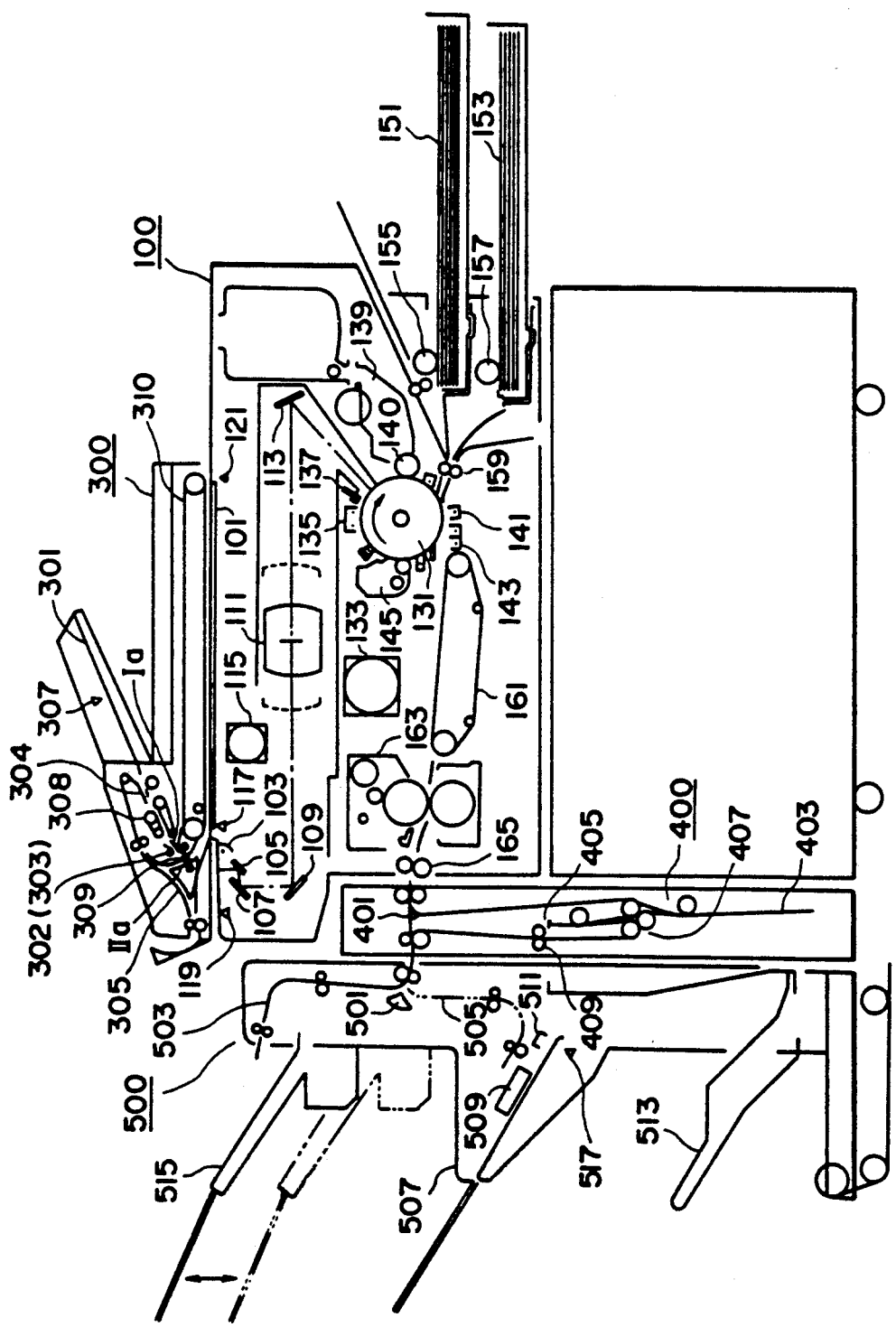
FIG. 1 is a schematic view showing an arrangement of an original handling apparatus according to an embodiment of the present invention.

FIG. 1 shows the internal structure of an image recording apparatus according to an embodiment of the present invention. The apparatus includes a main body 100 capable of performing an image reading function and an image recording function, a circulation original feed unit (to be referred to an RDF hereinafter) 300, a sheet folding unit 400 for folding a sheet at a predetermined position, and a finisher (i.e., a postprocessing unit) 500 having a sorting function and a stapling function. The units 300 to 500 are arbitrarily combined with the main body 100.

A. Main Body (100)

The main body 100 includes an original glass table 101 for supporting an original, an illumination lamp (i.e., an exposure lamp) 103 for illuminating the original, scanning reflection mirrors (scanning mirrors) 105, 107, and 109 for changing an optical path of light reflected by the original, a lens 111 having a focusing function and a one-to-one magnification function, and a fourth reflection mirror (scanning mirror) 113 for changing the optical path. The main body 100 also includes an optical motor 115 and sensors 117, 119, and 121.

The main body 100 further includes a photosensitive drum 131 and a main motor 133 for driving the photosensitive drum 131. A high voltage unit 135, a blank exposure unit 137, a transfer charger 141, a separation charger 143, and a cleaning unit 145 are arranged around the photosensitive drum 131.

Upper and lower cassettes 151 and 153 are detachably mounted in the side surface of the image recording apparatus. Sheet feed rollers 155 and 157 and registration rollers 159 are arranged along the sheet feed path. A conveyor belt 161 conveys the recording sheet with an image to a fixing side. The image is then fixed by a fixer 163 for fixing the image on the recording sheet with heat under pressure.

The surface layer of the photosensitive drum 131 comprises a seamless photosensitive layer of a photoconductive material and an electrically conductive material. The photosensitive drum 131 is rotatably supported about a shaft and is rotated in an arrowed direction (FIG. 1) by the main motor 133 operated in response to depression of a copy start-key (to be described later). When predetermined rotation control and potential control (preprocessing) of the drum 131 are completed, the original placed on the original glass table 101 is illuminated by the illumination lamp 103 arranged integrally with the first scanning mirror 105. Light reflected by the original is guided and focused on the drum 131 through the first scanning mirror 105, the second scanning mirror 107, the third scanning mirror 109, the lens 111, and the fourth scanning mirror 113.

The drum 131 is corona-charged by the high voltage unit 135. An image (original image) illuminated by the illumination lamp 103 is slit-exposed and a latent image is formed on the drum 131.

The latent image on the drum 131 is developed by a developing roller 140 in a developing unit 139 and a visible image as a toner image is formed on the drum 131. The toner image is transferred on a transfer sheet by the transfer charger 141 in a manner to be described later.

Each transfer sheet in the upper or lower cassette 151 or 153 is fed inside the apparatus by the sheet feed roller 155 or 157 and is registered by the registration rollers 159. More specifically, the sheet is registered by the registration rollers 159 at an accurate timing in a direction toward the photosensitive drum 131 such that the image tip is aligned with the leading end of the transfer sheet. The transfer sheet then passes between the transfer charger 141 and the drum 131, and the toner image on the drum 131 is transferred to the transfer sheet. At the end of transfer operation, the sheet is separated from the drum 131 by the separation charger 143. The separated sheet is guided to the fixing unit 163 by the conveyor belt 161. The image is fixed with heat under pressure, and the sheet with the fixed image is discharged outside the main body 100.

After the transfer operation, the drum 131 continuously rotates, and its surface is cleaned by the cleaning unit 145 comprising a cleaning roller and an elastic blade.

B. RDF (Circulation Original Feed Unit) (300)

The RDF 300 includes a stacking tray 301 for setting an original and original size sensors 302 and 303. The original size sensors 302 and 303 are arranged with a predetermined interval therebetween along the width of the original. The original size can be detected such that one sensor 303 (note that the sensor 303 is located on the trailing end side of the sheet) detects the original or both the sensors 302 and 303 detect the original. By increasing the number of sensors of this type, the accurate size of the original can be detected. The length of the original can be detected by a time during which the sensor 303 (or 302) detects the original.

The RDF 300 can feed the original to the exposure surface from the stacking tray 301 through a sheet path 304, and the sheet can be returned again onto the stacking tray 301 through a sheet path 305. A sensor 307 serves as a sensor for detecting one circulation cycle of the originals.

C. Sheet Folding Unit (400)

The sheet folding unit 400 folds the recorded transfer sheet at its central portion into halves or at two predetermined positions into three portions in a Z-shaped manner. The sheet folding unit 400 includes a flapper 401 for guiding the transfer sheet downward during sheet folding, paths (convey paths) 403 and 405, and folding rollers 407 and 409.

When a Z-folding mode is set by a Z-folding key (to be described later) in the sheet folding unit 400, the flapper 401 is actuated to guide the recorded sheet to the lower path 403. When the leading end of the sheet is stopped by the terminal end of the path 403, the sheet portion folded into $\frac{1}{4}$ through the roller 407 abuts against the terminal end of the path 405. The sheet is further folded into halves and is guided from the roller 407 to the finisher 500 through the roller 409. When a half-folding mode is set by a half-folding key (to be described later), the recorded sheet is folded into halves at a portion of the path 403 and is discharged from the roller 409 to the finisher 500 without being fed through the path 405. When a non-folding mode is set, i.e., when a folding key is not used, the flapper 401 is kept disabled. The recorded sheet is discharged directly to the finisher 500.

D. Finisher (500)

The finisher 500 for performing sorting or stapling of the recorded sheets includes a path selection flapper 501 for selecting one of a sorting path 503 and a stapling path 505, a staple tray 507 for temporarily stacking the recorded sheets prior to stapling, a widthwise alignment plate 509 disposed on the staple tray 507, a stapler (document stapler) 511 for stapling a plurality of recorded sheets after widthwise alignment, a stacker tray 513 for stacking the stapled recorded sheets, and a sorting tray 515 for sorting nonstapled recorded sheets. The widthwise alignment plate 509 is driven and controlled by a stepping motor (not shown).

The recorded sheet discharged from the main body 100 is folded by the sheet folding unit 400 in the half- or Z-folding mode upon operation of a corresponding folding key and is discharged onto the swingable sorting tray 515 in the finisher 500. Alternatively, the recorded sheets are discharged onto the staple tray 507 and a set of recorded sheets are aligned in the widthwise direction by the widthwise alignment plate 509. These sheets are stapled by the stapler 511 and are dropped on the stacker tray 513.

When the staple mode is selected by a staple key (to be described later), the discharge flapper 501 is actuated in the finisher 500 and the recorded sheet is discharged to the staple tray 507 through the path 505. When a predetermined number of sheets are stacked on the tray 507, the widthwise alignment plate 509 and the stapler 511 are operated in response to an instruction of the main body 100, and the recorded sheets are stapled by the stapler 511. The stapled sheets are dropped on the stacker tray 513. The above operations are repeated to obtain a desired number of stapled document sets. A sensor 517 detects the presence/absence of staples in the stapler 511 and comprises a reflection type sensor.

When the staple mode is not set, the discharge flapper 511 is kept OFF and the sorting mode is set. The recorded sheets are discharged onto the sorting tray 515 through the path 503. In this case, the sheets are stacked on the sorting tray 515 while they are offset by 30 mm in the right-and-left direction in units of predetermined numbers of sheets.

Figure 2:
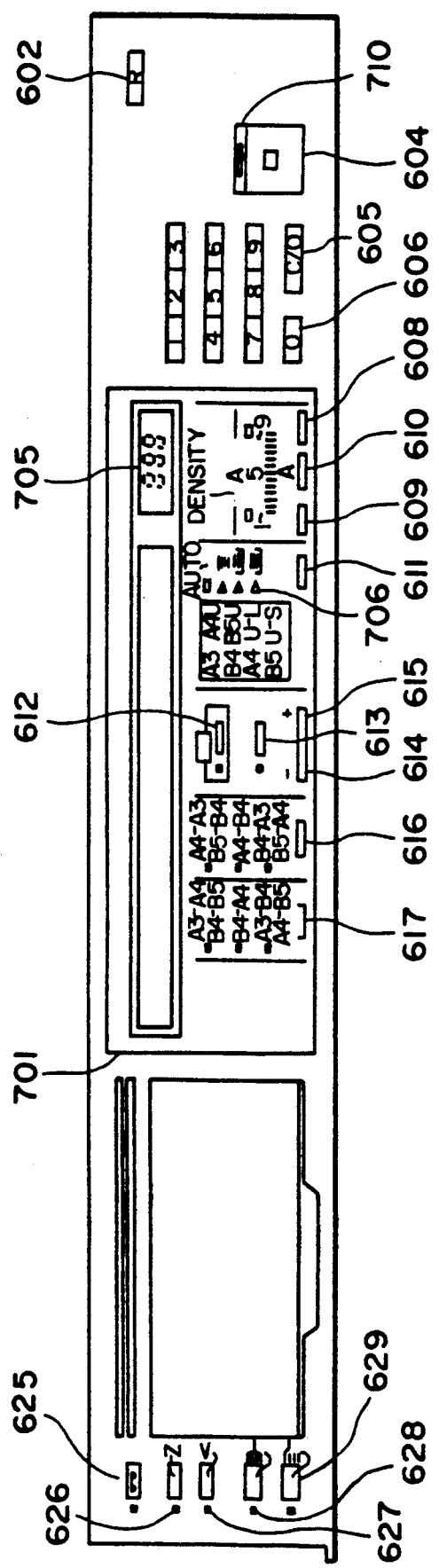
FIG. 2 is a view showing an operation unit in the apparatus shown in FIG. 2.

FIG. 2 shows an arrangement of the operation panel in the main body 100. The operation panel includes a key group 600 and a display group 700 to be described below.

E. Key Group (600)

An all reset key 602 is depressed to restore the normal mode.

A copy start-key 604 is depressed to start copying.

A clear/stop key 605 serves as a clear key in the standby mode and as a stop key during copying. The clear key is depressed to cancel the number of sheets to be copied. The stop key is used to interrupt continuous copying. Upon depression of the stop key, copying is stopped.

A ten-key pad 606 is used to set the number of sheets to be copied.

Copy density keys 608 and 609 are used to manually adjust the density of copies. An AE (Auto Exposure) key 610 is depressed to automatically adjust the copy density in accordance with a density of an original. The AE key 610 is also depressed to cancel the AE mode and to manually perform density control. A cassette selection key 611 is depressed to select the upper cassette 151 or a middle cassette 153. When an original is placed on the RDF 300, the key 611 is used to perform APS (Auto Paper Selection). In the APS mode, the cassette which contains sheets having the same size as that of the original is automatically selected.

A one-to-one magnification key 612 is depressed to make a copy of a one-to-one magnification. An auto variable magnification key 613 is depressed to automatically reduce or enlarge the image size of the original in accordance with a designated transfer sheet size. Zoom keys 614 and 615 are selectively depressed to obtain a desired magnification in the range between 64% and 142%. Standard magnification keys 616 and 617 are depressed to designate a standard reduction or enlargement size.

A staple key 625 is depressed to staple the recorded sheets. A Z-folding key 626 is depressed to fold an A3- or B4-sized recorded sheet in a Z cross-sectional shape. A half-folding key 627 is depressed to fold an A3- or B4-sized recorded sheet into halves.

A sorting key 628 is kept ON in the normal mode when the sorting tray (sorter) 515 is connected to the main body 100. In order to cancel the sorting mode or set a mode excluding the sorting mode, the sorting key 628 is depressed. A group key 629 is used to perform multi-copying of each original to store identical copies in corresponding bins in the sorting tray 515 if the tray 515 is connected to the main body 100.

F. Display Group (700)

A message display 701 shown in FIG. 2 comprises an LCD (Liquid Crystal Display) unit. Each character is represented by 5×7 dots. The display unit 701 can display a maximum of 40 characters.

A number-of-sheets-to-be-copied display unit 705 displays the number of sheets to be copied or a self-diagnosis code. A display unit 706 displays the currently used cassette among the upper cassette 151 and the middle cassette 153.

An AE indicator 708 is turned on when the AE mode is selected by the AE key 610. A ready/wait indicator 710 is turned on in green in the ready mode (copying enable state) and in orange in the wait mode (copying disable state).

G. Control Unit (800)

Figure 3:
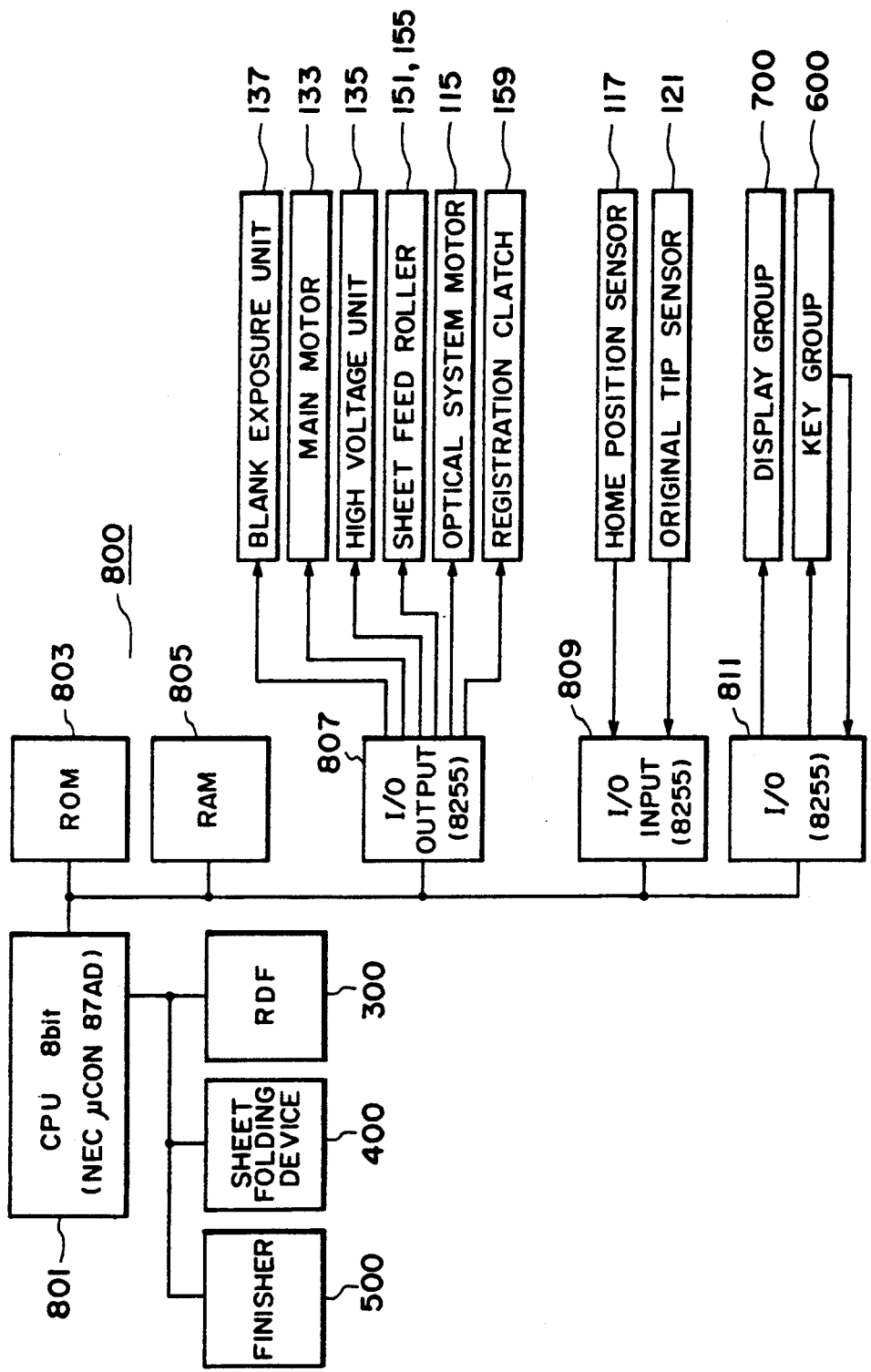
FIG. 3 is a block diagram of a control unit of the apparatus shown in FIG. 1.

FIG. 3 shows a circuit arrangement of a control unit 800 in the image recording apparatus shown in FIG. 1. The control unit 800 in FIG. 3 includes a central processing unit (CPU) 801 for performing arithmetic operations and control so as to practice the present invention. A microcomputer μCOM87AD, available from NEC CORPORATION, JAPAN is used as the CPU 801. The control unit 800 also includes a read-only memory (ROM) 803 for storing control sequences (control programs) shown in FIG. 4. The CPU 801 controls the circuit components connected thereto through buses in accordance with the control programs stored in the ROM 803. A random access memory (RAM) 805 is connected to the CPU 801 and is used as a main memory serving as a memory for storing input data and as a working memory area.

Interfaces (I/Os) 807, 809, and 811 are also connected to the CPU 801. The interface 807 outputs a control signal from the CPU 801 to a load such as the main motor 133. The interface 809 receives input signals from the image tip sensor 121 and the like and supplies them to the CPU 801. The interface 811 controls the input/output between the key group 600 and the display group 700. An I/0 port μPD8255 available from NEC CORPORATION may be used as the interfaces 807, 809, and 811.

The dislay group 700 includes the display units and indicators (FIG. 2) which are constituted by LEDs and LCDs. The key group 600 includes the keys shown in FIG. 2. The CPU 801 detects a depressed key in accordance with a key matrix.

The CPU 801 is connected to the RDF 300, the sheet folding unit 400, and the finisher 500 through bus lines and controls their operations.

Figure 4:
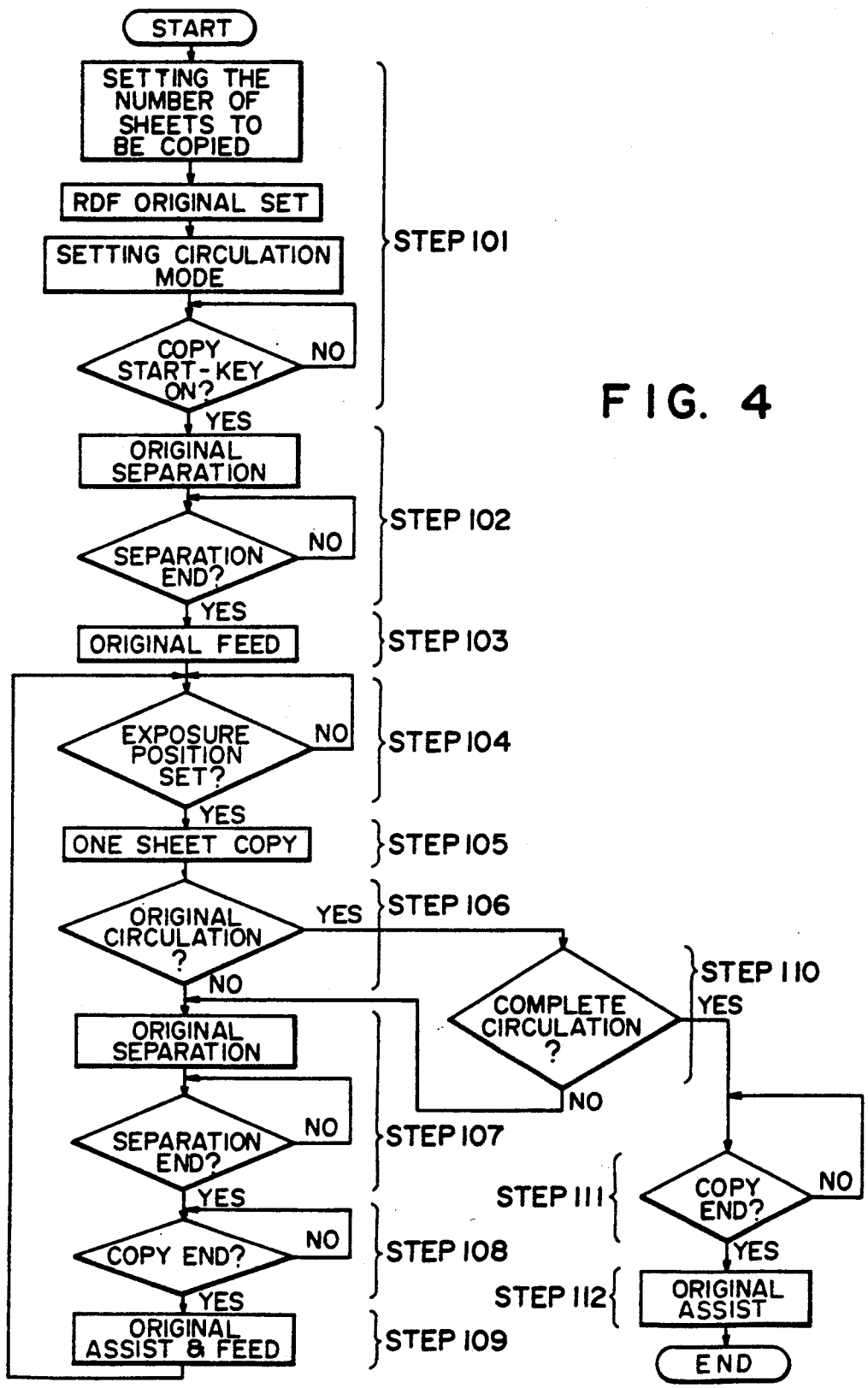
FIG. 4 is a flow chart for explaining the operation of the control unit.

The operation of the control unit will be described with reference to a flow chart in FIG. 4. The number of copy sets is set by the ten-key pad 606, and originals are set on the tray 301 in the RDF. A mode is set to allow circulative operations of the RDF (e.g., a staple or shift mode of the finisher) so as to obtain each copy set. When an operator depresses the copy start-key 604 (step 101), the following control operations are performed in accordance with the flow.

The RDF separates the sheets one by one from the lowermost sheet in cooperation with a separation belt 308. The separated sheet is fed to a convey roller 309 along a convey path Ia (step 102). The original is then fed by the convey roller 309 and a wide belt 310 (step 103). The sheet is then stopped at the exposure position on the original glass table 101 (step 104). Copying of each original is performed (step 105).

In this case, the CPU 801 checks in step 106 in accordance with an output from the sensor 307 if the circulated original is the last original. If NO in step 106, the next original is separated and fed to the convey roller 309 (step 107) and the CPU 801 waits for the end of copying (step 108). In this embodiment, when the optical system perfectly performs original exposure and reaches a return position, the end of conveyance is detected. When copying is completed, the RDF drives the wide belt 310 in the reverse direction to discharge the original subjected to copying along a convey path IIa. At the same time, the next original is fed (step 109), thereby minimizing the loss time of the original change. The flow returns to step 104, and the second original is stopped at the exposure position.

The operations in steps 104 to 109 are repeated. When one circulation cycle of the originals is completed, the flow advances from step 106 to step 110. The CPU 801 checks in step 110 if the number of circulation cycles reaches a preset value. If NO in step 110, the flow returns to step 107 and the predetermined operations for separating the originals belonging to the second circulation cycle are performed. This leads to an advantage in that processing to change the original at the exposure position can be completed within the period of time required for normal processing to change the original even if an original change involves the first and second circulation cycles. If YES in step 110, the CPU 801 waits for the end of copying (step 111) and entire operations are completed after the originals are discharged (step 112).

The above embodiment exemplifies the copying machine. However, the present invention is also applicable to an original processing section in a facsimile system or an electronic file system.

As described above in detail, when the number of copy sets does not reach a preset circulation count at a timing between the original circulation cycles, the first original of the next circulation cycle is separated and held before the end of exposure of the last original of the current circulation cycle. The original is discharged simultaneously when exposure is completed, thereby providing a high-speed original handling apparatus.

What is claimed is:

1. An original handling apparatus comprising:
    storing means for storing a bundle of originals;
    circulating means for feeding each original in the bundle of originals stored in said storing means to an exposure position, and for discharging the exposed original from the exposure position to said storing means, said circulating means including separation means for separating one-by-one each original form the bundle of originals stored in said storing means;
    setting means for setting a desired number of circulation cycles of the bundle of originals stored in said storing means;
    detecting means for detecting one circulation cycle of the bundle of originals; and control means for controlling said circulating means so as to circulate the bundle of originals for the number of circulation times set by said setting means, wherein said control means functions such that after an original is fed to the exposure position, feeding of the succeeding original is initiated before discharge of the preceding original from the exposure position is initiated, said control means actuates said separation means to separate the succeeding original, causes the succeeding original to wait at a predetermined position loaded on an upstream side of the exposure position in relation to a direction of the original feeding, and feeds the succeeding original in waiting at the predetermined position in synchronism with discharge of the preceding original having undergone an exposure operation; and wherein said control means determines, in accordance with an output of said detection means, whether circulation of the bundle of originals for the number of circulation times set by said setting means has been completed, and provides such a control that if no completion is determined, said control means controls said circulating means so as to start feeding of a first original of the next circulation cycle prior to discharging a last original from the exposure position in the current circulation cycle, and if such completion is determined, said control means controls said circulating means so as not to perform feeding of a first original of the next circulation cycle.

2. An apparatus according to claim 1, wherein said circulating means comprises separating means for separating the bundle of originals stored in said storing means one by one, feeding means for feeding the original separated by said separating means to the exposure position, and discharging means for discharging the original from the exposure position and returning the original to said storing means.

3. An apparatus according to claim 1, wherein said circulating means comprises separating means for separating the bundle of originals stored in said storing means one by one, and said control means controls said separating means so as to cause said separating means to start a first original separating in a next circulation cycle.

4. An apparatus according to claim 1, wherein said circulating means comprises convey means disposed at a position intermediate said storing means and the exposure position, said control means controlling the circulating means so as to start feeding said first original such that said first original is fed to said convey means prior to discharging said last original from the exposure position.

5. An original handling apparatus comprising:
   storing means for storing a bundle of originals;
   circulating means for feeding each original in the bundle of originals stored in said storing means to an exposure position, and for discharging the exposed original from the exposure position to said storing means;
   setting means for setting a desired number of circulation cycles of the bundle of originals stored in said storing means; and
   control means for controlling said circulating means so as to circulate the bundle of originals for the number of circulation times set by said setting means,
   wherein said control means controls said circulating means so as to start feeding of a first original of the next circulation cycle prior to discharging a last original from the exposure position in the current circulation cycle, and said circulating means is adapted to perform feeding and discharging of the originals at the same side as to said exposure position.

* * * * *